(No Model.) 2 Sheets—Sheet 2.
M. GOREL.
Thrashing and Mowing Machine.
No. 234,270. Patented Nov. 9, 1880.
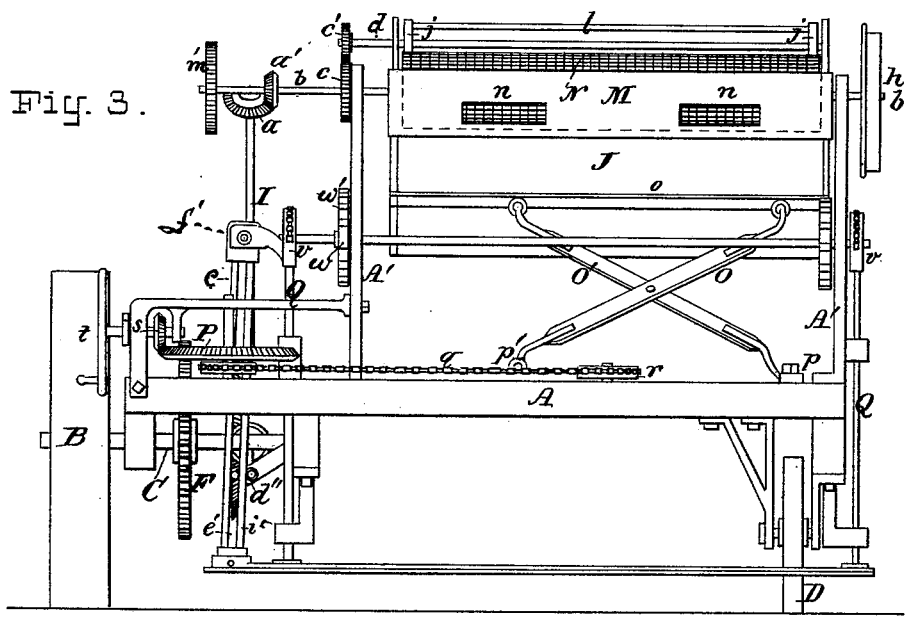
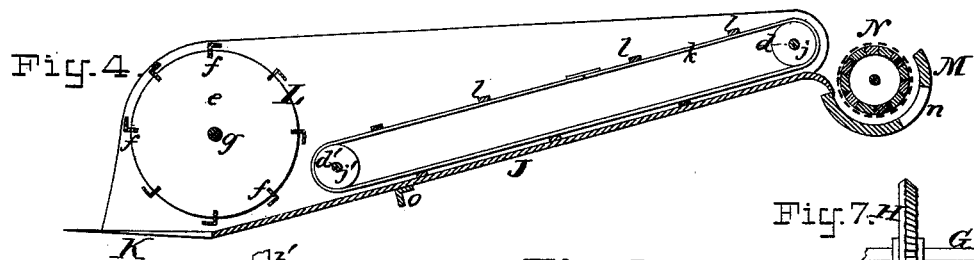
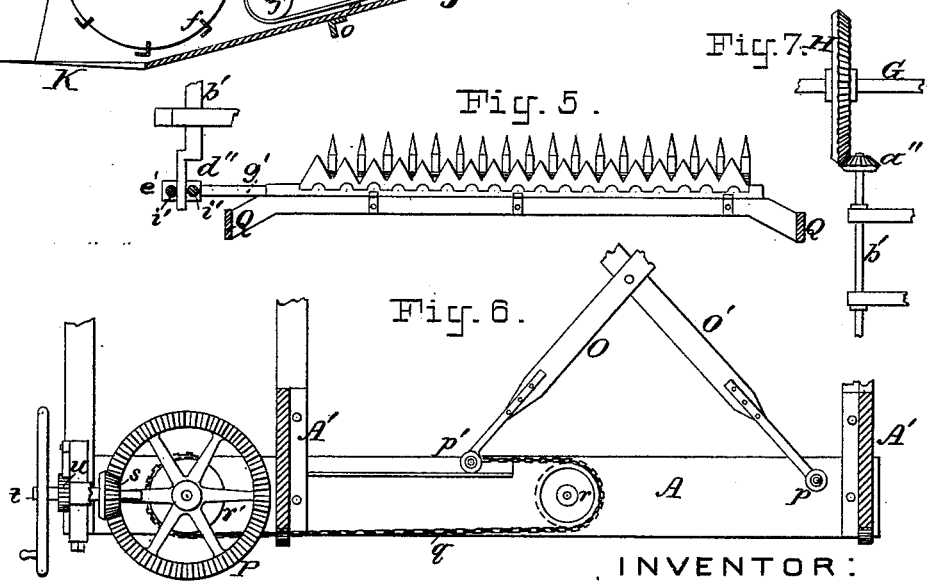
ATTEST:
E. B. Bolton
J. H. Druithorne
INVENTOR:
Maurice Gorel
by his atty's
Burke, Fraser & Connett

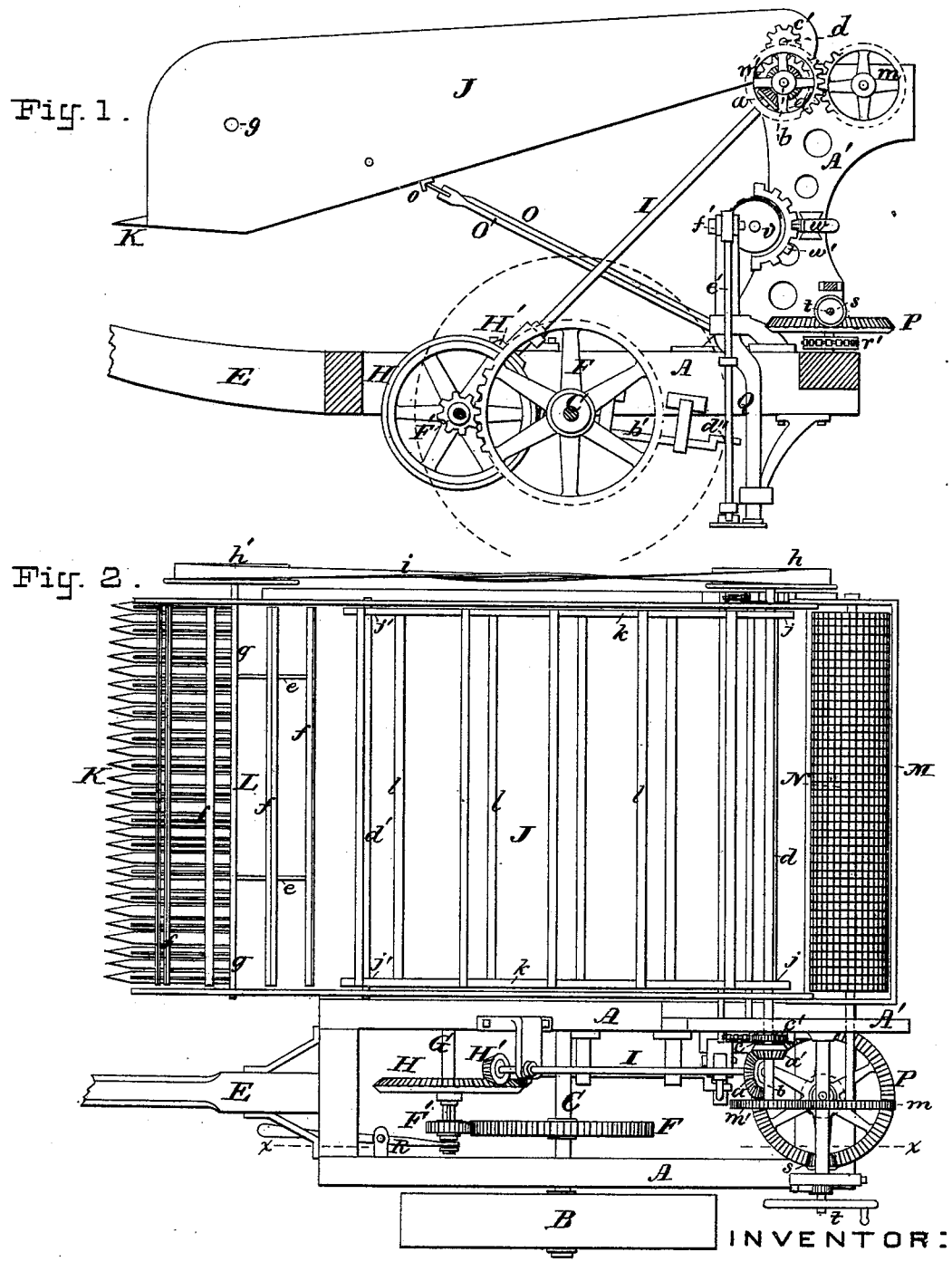

UNITED STATES PATENT OFFICE.

MAURICE GOREL, OF PARIS, FRANCE.

THRASHING AND MOWING MACHINE.

SPECIFICATION forming part of Letters Patent No. 234,270, dated November 9, 1880.

Application filed July 10, 1880. (No model.) Patented in France June 10, 1880.

*To all whom it may concern:*

Be it known that I, MAURICE GOREL, a citizen of the French Republic, residing in Paris, France, have invented certain new and useful Improvements in Machinery for Thrashing Standing Grain and Cutting the Straw of the Same, of which the following is a specification.

This invention relates to that class of machines adapted, as the title indicates, to thrashing out the grain from the heads while the straw is standing, and afterward cutting the straw close to the ground, the cutter being borne and operated by the same machine. These machines usually employ a comb to gather the heads, a rotary beater to beat out the grain therefrom, a carrier for taking away the grain, and a cutter at the rear for cutting the straw left standing.

My invention consists in the specific features hereinafter set forth and claimed.

In the drawings which serve to illustrate my invention, Figure 1 is a sectional elevation of the machine, the section being taken on the line $x\,x$ in Fig. 2. Fig. 2 is a plan of the machine. Fig. 3 is a rear elevation of the machine. Figs. 4, 5, 6, and 7 are detached views, which will be more particularly referred to hereinafter.

Let A represent, in general, the frame-work of the machine, and B the ground-wheel from which the operative mechanism is driven. This wheel is fixed on a shaft, C, which has bearings in the frame A on the left-hand or draft side of the machine. The other side of the machine is supported on one or more lesser wheels, D. The draft for propelling the machine is applied to the tongue E.

The machine has two functions—the gathering and thrashing of the grain and the cutting or mowing of the straw.

I will describe the mechanism which gathers and thrashes the grain first. On the shaft C is mounted a spur-wheel, F, which meshes with a pinion, F', on a counter-shaft, G, mounted in bearings on the frame, and on this same shaft G is fixed a spur bevel-wheel, H, which meshes with a bevel-pinion, H', mounted on the lower end of an obliquely-arranged shaft, I, which bears a miter-wheel, $a$, on the upper end. This miter-wheel meshes with another wheel, $a'$, on a horizontal cross-shaft, $b$, that has bearings in uprights A' in the main frame.

On the shaft $b$, inside of the miter-wheel $a'$, is mounted a pinion, $c$, which meshes with another like pinion, $c'$, on a cross-shaft, $d$, above the shaft $b$, which also has bearings in the upright frames A', and passes through and supports the rear end of a box or platform, J. This box extends forward and is open at both ends, the front end being provided with a comb, K, provided with teeth, as shown, arranged far enough apart to allow the straws of the standing grain to pass between them as the machine advances, and preferably so close together as to prevent the passage of the heads containing the seeds or grain. Its function will be hereinafter explained.

In or on the forward end of the box or platform J is mounted a beater or thrashing-reel, L, which may be constructed of two or more disks, $e$, bearing blades $f$ and mounted on a cross-shaft, $g$. This shaft is rotated by means of pulleys $h\,h'$, fixed in the extremities of the shafts $b$ and $g$, respectively, and a cross-belt, $i$.

On the shaft $d$, inside of the box J, at its upper or rear end, are fixed pulleys $j\,j$, and on a corresponding shaft, $d'$, at the forward end of the box, next to the beater L, are similar pulleys, $j'\,j'$. These pulleys bear endless belts $k\,k$, which carry slats $l\,l$, arranged at intervals and adapted to move toward the rear in close proximity to the bottom of the box J. These slats serve as rakes or conveyers to carry the grain from the beater back to the receiver, which will be more particularly described hereinafter.

The mechanism just described is that shown in Figs. 2 and 4, the latter of which is a sectional view of the box J and its interior mechanism.

So far as described the operation is as follows: The machine being drawn forward through the standing grain, the fingers of the comb K engage the straw just below the heads and crowd the latter back within reach of the beater L. The beater is set in rapid motion through the various mechanical elements just described, the power being derived from the ground-wheel, and its blades $f$ repeatedly strike the heads and knock out the grains or seeds therefrom, after which the latter are forced backward under the raking-slats $l$, which carry them back and deliver them into a semi-cylindrical trough or casing, M. In this trough revolves a gathering-drum, N, covered with or formed of wire-gauze, which serves to separate the grain from such heads as may have passed the beater, and to remove the husks where they still stick to the grain. This drum is mounted on a shaft which bears a toothed wheel, $m$, and said wheel meshes with a similar wheel, $m'$, on the shaft $b$, whereby motion is imparted to the drum. In the casing M is arranged an opening or openings, $n$, for the escape of the grain, which may be caught in bags suspended thereunder.

The rear end of the box or platform J hangs on the shaft $d$, and the front end is supported on an X-shaped frame, whereby it may be raised or lowered to suit the height of the standing grain. This device is constructed as follows: O O' are crossed levers, pivoted together, preferably at their centers, in the manner of a pair of scissors. The forward free ends of the levers are or may be provided with friction-rollers, which engage a flanged track, $o$, on the under side of the box J, while the other ends are attached—one by a pivot to the frame at $p$, and the other, $p'$, to an operating chain or cord, $q$. This extremity $p'$ is also, by preference, provided with a friction-pulley arranged to travel in a track on the frame, as shown in Fig. 6, which shows this arrangement in plan. The chain $q$ passes around a sheave, $r$, and thence to a sheave, $r'$, to which it is attached. This latter sheave is fixed on a vertical shaft bearing a spur bevel-wheel, P, with which meshes a bevel-pinion, $s$, on a power-shaft, $t$, which bears a hand wheel or crank within easy reach of the operator.

By this mechanism the operator is enabled to readily adjust the height of the comb K above the ground, both before and during the operation of the machine, in order to conform to the varying heights of grain. The action of the mechanism is to bring the ends $p$ $p'$ of the levers O O' more or less nearly together.

An ordinary pawl and ratchet, $u$, serves to stop the lifting-gear at any desired point. A screw or other equivalent mechanism might be substituted for the gears and chain $q$ for bringing the ends of the levers together, if preferred to that shown, the said screw passing through a nut swiveled in the extremity $p'$ of the lever.

The mechanism for cutting the straw consists of any good form of cutter-bar, as shown in plan in Fig. 5. This bar is hung in a frame, Q, arranged to have some vertical movement in keepers on the main frame A, and adapted to be raised by some suitable mechanism to adjust the cutter-bar to the height at which the straw is to be cut, or to lift it above obstacles when the machine is being drawn to and from the field.

The lifting device shown consists of one or more sheaves, $r$, on a cross-shaft having bearings in the frame, provided each with a chain, one end of which is fixed to the sheave and the other to the frame Q. By winding the chains on the sheaves the frame and cutter-bar is lifted, and when lifted it is retained in position by means of a dog, $w$, arranged to engage a notched segment, $w'$, on the shaft. A screw might, however, be substituted for the mechanism here shown for raising the cutter-bar frame.

The mechanism for reciprocating the cutter-bar consists of a bevel-pinion, $a''$, mounted on a shaft, $b'$, and arranged to mesh with the spur-bevel H. This is best shown in detail view, Fig. 7. On the end of the shaft $b'$ is a crank, $d''$, which engages a slot or elongated opening formed in a lever, $e'$, pivoted or hinged to the frame Q at $f'$. The lower end of this swinging lever is connected with the end of the reciprocating knife by means of a link, $g'$, as indicated in Fig. 5. The slot in the lever in which the crank $d''$ plays may be formed by two parallel rods, $i'$ $i'$, as indicated in the last-named figure, and the crank-wrist may turn in a block arranged to slide on said rods.

It will be readily understood that rotation of the crank produces alternate reciprocation of the knife or saw, as in ordinary harvesting-machines.

I may disengage all the mechanism from connection with the prime mover by shifting the pinion F' out of mesh with the spur-wheel F by means of a lever, R, in a well-known way. There may be two or more ground-wheels or prime movers, and they may be ratcheted on either shaft in a manner well understood by makers of harvesters; and the levers O O' might be inverted in position, and the mechanism for operating them applied to the other ends; but I prefer the arrangement shown.

Having thus fully described my invention, I claim—

1. The combination of the shaft $b'$, having a crank, $d''$, the lever $e'$, hinged to the frame Q and having a slot for the crank-wrist to play in, the said frame Q, the cutter-bar, and the link $g'$, to connect the lever $e'$ with the cutter-bar, all arranged substantially as herein set forth.

2. The combination of the cutter-bar, the frame Q, the slotted lever $e'$, and the link $g'$, for operating the cutter, the sheaves $r$, connected with the frame Q by means of chains or cords, the dog $w$, and the toothed segment or wheel $w'$, all combined and arranged as and for the purposes set forth.

3. The combination of the box or platform J, the comb or stripper K, the beater L, the raking mechanism, the belt $i$ and the pulleys $h$ $h'$, the shafts $b$ and $d$, the gears $c$ $c'$, $a$, $m$ $m'$, H H', and F F', shafts C, G, and I, and ground-wheel B, with the drum N and casing M, provided with outlets $n$ $n$, all arranged to operate substantially as set forth.

In witness whereof I have hereunto signed my name in the presence of two subscribing witnesses.

MAURICE GOREL.

Witnesses:
GEO. H. SCIDMORE,
CHARLES MARDELET.